United States Patent [19]
Ueno et al.

[11] Patent Number: 5,693,932
[45] Date of Patent: Dec. 2, 1997

[54] PHOTOELECTRIC CONVERTING APPARATUS WITH REDUCED ELECTRIC POWER COMSUMPTION

[75] Inventors: Isamu Ueno, Hadano; Mamoru Miyawaki, Isehara, both of Japan

[73] Assignee: Canon Kabushiki Kaisha, Tokyo, Japan

[21] Appl. No.: 527,177

[22] Filed: Sep. 15, 1995

[30] Foreign Application Priority Data

Sep. 16, 1994 [JP] Japan .................. 6-222044

[51] Int. Cl.$^6$ .................. H04N 5/335; H01L 27/00
[52] U.S. Cl. .................. 250/208.1; 348/308
[58] Field of Search .................. 250/208.1; 348/308, 348/332; 358/483

[56] References Cited

U.S. PATENT DOCUMENTS

| | | | |
|---|---|---|---|
| 4,583,002 | 4/1986 | Kondo et al. | |
| 4,683,382 | 7/1987 | Sakurai et al. | 327/544 |
| 4,879,470 | 11/1989 | Sugawa et al. | 250/578 |
| 4,959,723 | 9/1990 | Hashimoto . | |
| 5,162,912 | 11/1992 | Ueno et al. | 358/213.16 |
| 5,184,006 | 2/1993 | Ueno | 250/208.1 |
| 5,262,870 | 11/1993 | Nakamura et al. | 358/212 |
| 5,406,332 | 4/1995 | Shinohara et al. | 250/208.1 |

FOREIGN PATENT DOCUMENTS

| | | |
|---|---|---|
| 0414466 | 2/1991 | European Pat. Off. . |
| 2131545 | 6/1984 | United Kingdom . |

OTHER PUBLICATIONS

Patent Abstracts of Japan, vol. 15 No. 246 (E–1081), 24 Jun. 1991 & JP–A–03 077485 (Matsushita Electron Corp) 3 Apr. 1991, * abstract *.

Primary Examiner—Edward P. Westin
Assistant Examiner—Kevin Pyo
Attorney, Agent, or Firm—Fitzpatrick, Cella, Harper & Scinto

[57] ABSTRACT

To obtain a photoelectric converting apparatus of a small electric power consumption and a detecting method of a target object by using such an apparatus, the apparatus is first set to a low power source voltage mode, a reset and a transient reset are performed to a plurality of phototransistors as photoelectric converting devices and capacitors by pulses from terminals and a vertical shift register. After that, photoelectric conversion information is temporarily stored in capacitors and read out by a horizontal shift register. The read-out signal voltage is compared with a reference voltage by a comparator, thereby detecting the presence or absence of a reflection light. When the reflection light is detected, the apparatus is set to a high power source voltage mode and the reset and transient reset are again executed. After that information is read out from capacitors and is signal processed by an image processing circuit. Thus, the electric power consumption can be reduced.

22 Claims, 9 Drawing Sheets

PHOTOELECTRIC CONVERTING APPARATUS WITH REDUCED ELECTRIC POWER COMSUMPTION

BACKGROUND OF THE INVENTION

1. Field of the Invention

The invention relates to a photoelectric converting apparatus which is used as an image sensor for converting an optical image to an electric signal in a video camera, an image input apparatus, or the like and also relates to a detecting method of detecting a target object by using such a photoelectric converting apparatus.

2. Related Background Art

Hitherto, in case of constructing an image pickup system for optically detecting a target object and obtaining an electric image signal, a light source for illuminating the target object and a photoelectric converting apparatus for detecting a reflection light of the target object are provided.

Since the conventional image pickup system has been constructed as mentioned above, there are following problems.

(1) In order to illuminate the target object, since it is necessary to continuously turn on the light source, an electric power consumption increases, so that such a system is unsuitable for a portable apparatus which uses a battery as a power source.

(2) Since the detection is performed by judging only the presence or absence of the reflection light from the target object, it is difficult to judge whether the target object has correctly been detected or not. That is, an erroneous detection easily occurs or the like, so that it is difficult to detect at a high precision.

SUMMARY OF THE INVENTION

The invention is made to solve the above problems. It is an object of the invention to provide a photoelectric converting apparatus which can reduce an electric power consumption and can detect at a high precision and to obtain a method of detecting a target object by using such a photoelectric converting apparatus.

According to an aspect of the invention, there are provided a first circuit unit which operates at a first power source voltage, and a second circuit unit which operates at a second power source voltage that is higher than the first power source voltage and at least a part of which is common to the first circuit unit.

According to another aspect of the invention, there is provided a photoelectric converting apparatus having a plurality of photoelectric converting units, a driving circuit unit for driving the photoelectric converting units, and a reading circuit unit for reading out information of each of the photoelectric converting units, wherein the apparatus has a first circuit unit which operates at a first power source voltage and a second circuit unit which operates at a second power source voltage higher than the first power source voltage and in which at least the photoelectric converting units are common to those of the first circuit unit.

According to further another aspect of the invention, there is used a photoelectric converting apparatus comprising a first circuit unit which operates at a first power source voltage and a second circuit unit which operates at a second power source voltage higher than the first power source voltage and at least a part of which is common to the first circuit unit, wherein a reflection light from a target object is detected by making the first circuit unit operative at the first power source voltage, and when the reflection light is detected, the second circuit unit is made operative at the second power source voltage, thereby detecting an image of the target object.

According to one aspect, by providing the first circuit unit which operates at a low power source voltage and the second circuit unit which operates at a high power source voltage, the apparatus can be efficiently made operative and the electric power consumption can be reduced.

According to another aspect, by making the first circuit unit operative at a low power source voltage, only the reflection light from the target object is detected. By making the second circuit unit operative at a high power source voltage on the basis of such a detection, an image of the target object can be detected in detail.

The above and other objects and features of the present invention will become apparent from the following detailed description and the appended claims with reference to the accompanying drawings.

DETAILED DESCRIPTION OF THE PREFERRED EMBODIMENTS

According to an embodiment of the invention, a two-dimensional photoelectric converting apparatus having a plurality of photoelectric converting devices corresponding to a plurality of pixels is used. The photoelectric converting apparatus is first made operative in a first mode in which a power source voltage is set to a low voltage, thereby detecting only the presence or absence of a reflection light from a target object. When the reflection light is detected, the apparatus is made operative in a second mode in which the power source voltage is set to a higher voltage and pixel information from each of the photoelectric converting devices is processed in detail.

Figure 1:
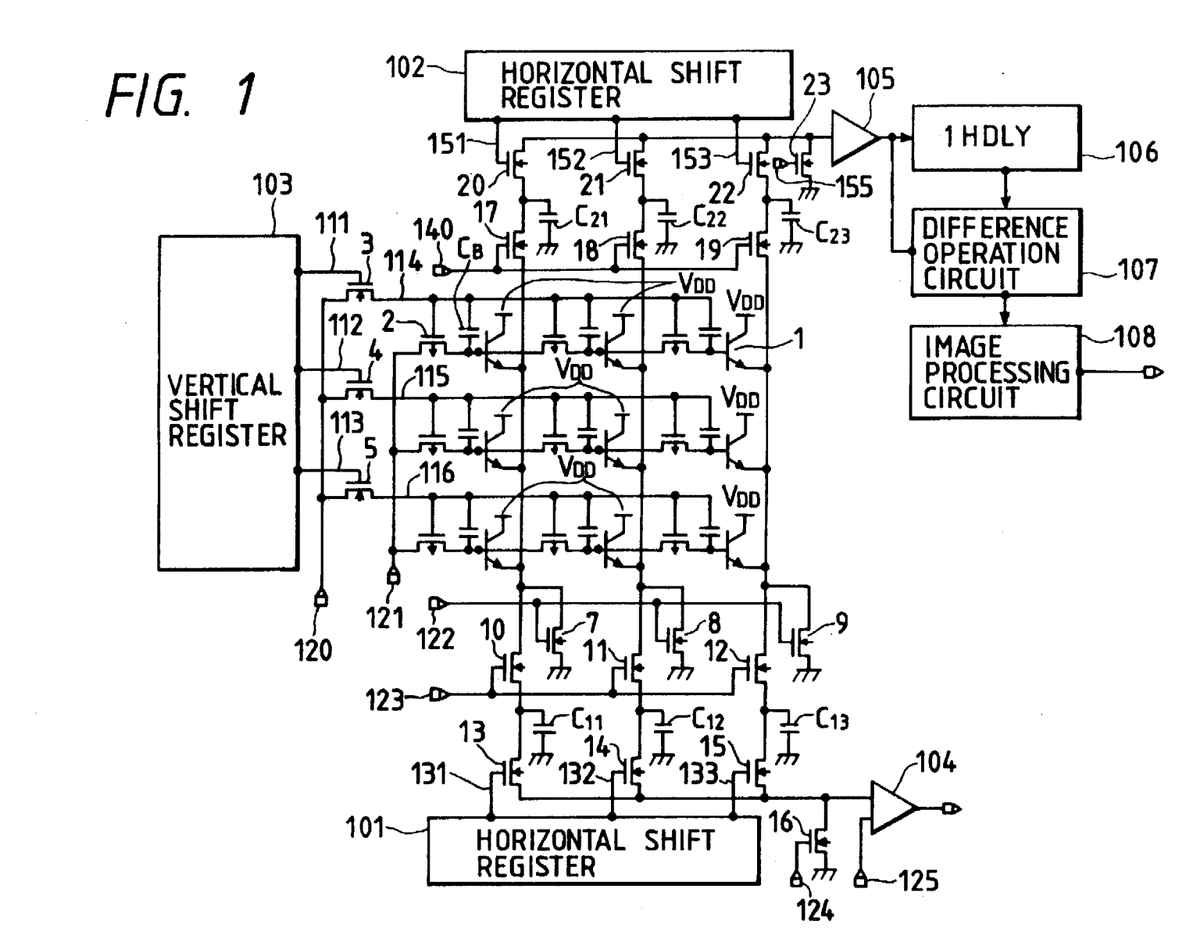
FIG. 1 is a circuit diagram showing the first embodiment of the invention.

FIG. 1 shows the first embodiment.

In FIG. 1, according to the embodiment, a bipolar type NPN phototransistor 1 is used as a photoelectric converting device. The transistor 1 is formed by nine pixels constructed by arranging every three pixels in the row and column directions. A power source voltage $V_{DD}$ is applied to a collector of each transistor 1.

One end of a capacitor $C_B$ and one end of a PMOS transistor 2 are connected to a base of each transistor 1. The transistors 2 are serially connected every row. One end of each serial circuit is connected to a terminal 121. The other end of the capacitor $C_B$ and a gate of the transistor 2 are connected to driving lines 114, 115, and 116 every row. The driving lines 114, 115, and 116 are connected to a terminal 120 through NMOS transistors 3, 4, and 5. Gates of the transistors 3, 4, and 5 are connected to a vertical shift resister 103 through driving lines 111, 112, and 113.

Emitters of the transistors 1 are connected in a lump every column and their connection point is connected to the ground through NMOS transistors 7, 8, and 9 and are also connected to one input terminal of a comparator 104 through NMOS transistors (10 and 13), (11 and 14), and (12 and 15), respectively. Gates of the transistors 7, 8, and 9 are connected to a terminal 122. Gates of the transistors 10, 11, and 12 are connected to a terminal 123.

The transistors 13, 14, and 15 are connected to a horizontal shift resister 101 for the first mode via driving lines 131, 132, and 133. The input terminal of the comparator 104 is connected to the ground through an NMOS transistor 16. A gate of the transistor 16 is connected to a terminal 124. A reference voltage is applied to the other input terminal of the comparator 104 from a terminal 125. Storage capacitors $C_{11}$, $C_{12}$, and $C_{13}$ are connected between the transistors (10 and 13), (11 and 14), and (12 and 15), respectively.

The connection point at which the emitters of the transistors 1 are connected in a lump is also connected to a buffer amplifier 105 through NMOS transistors (17 and 20), (18 and 21), and (19 and 22), respectively. Gates of the transistors 17, 18, and 19 are connected to a terminal 140. Gates of the transistors 20, 21, and 22 are connected to a horizontal shift register 102 for the second mode via driving lines 151, 152, and 153. An input terminal of the buffer amplifier 105 is connected to the ground through an NMOS transistor 23. A gate of the transistor 23 is connected to a terminal 155.

An output of the buffer amplifier 105 is supplied to a 1H delay circuit 106. The above output and a 1H delay output are supplied to a difference operation circuit 107. Its difference output is supplied to an image processing circuit 108.

Figure 2:
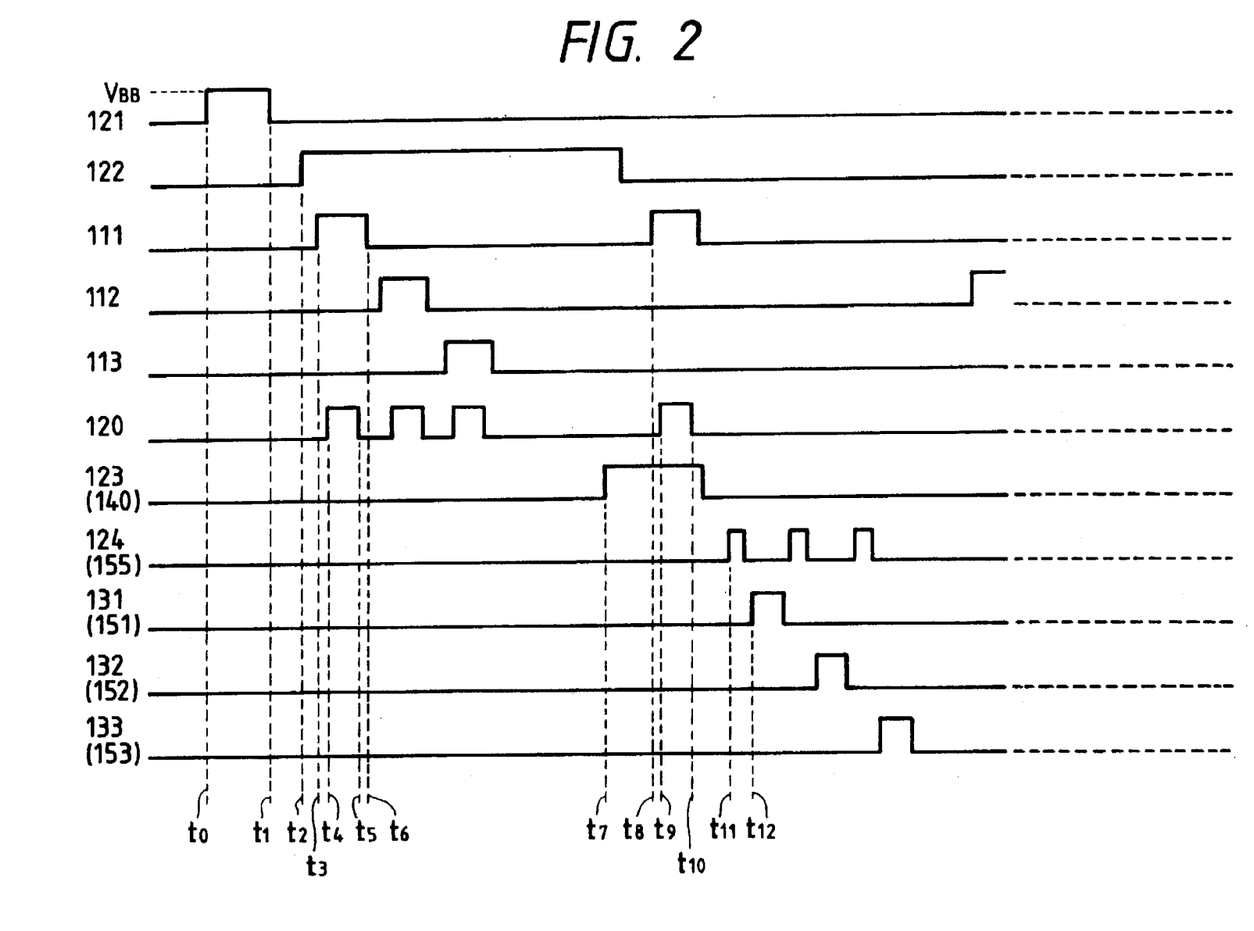
FIG. 2 is a timing chart showing the operation of the first embodiment.

The operation in the above construction will now be described hereinbelow with reference to FIG. 2.

First, a first mode such that the power source voltage of the circuit is set to a voltage lower than a second power voltage is set. For a period of time from $t_0$ to $t_1$ a pulse voltage $V_{BB}$ is applied to the terminal 121. In this instance, by setting the driving lines 114, 115, and 116 to a ground level and by setting the voltage $V_{BB}$ to a value which is equal to or larger than a threshold voltage $V_{th}$ of the transistor 2, all of the transistors 2 are turned on. In this state, therefore, a base potential of each of the transistors 1 is reset to the voltage $V_{BB}$ and is held in the capacitor $C_B$ (clamping reset).

When the voltage $V_{BB}$ drops, a pulse of the H level is subsequently sent to the terminal 122 from time $t_2$, thereby turning on the transistors 7, 8, and 9. Thus, the emitters of the transistors 1 are connected to the ground. The vertical shift resister 103 is subsequently made operative, thereby sequentially supplying pulses to the driving lines 111, 112, and 113. For a period of time of each pulse, the pulses are supplied to the terminal 120.

When the pulse is supplied to the driving line 111 for a period of time from $t_3$ to $t_6$, the transistor 3 is turned on. When the pulse is supplied to the terminal 120 at time $t_4$, a voltage appears in the driving line 114. Such a voltage raises a base potential of the transistor 1 through the capacitor $C_B$. In this instance, a voltage between the base and emitter of each of the three transistors 1 as pixels of the first row enters a forward bias state. Each of the transistors 1 performs an emitter follower operation. Consequently, the base potential is decreased to a value near the ground level by a recombination of holes (transient reset).

When the pulse of the terminal 120 is trailed at time $t_5$, on the contrary, the base potential is changed to the negative side and the voltage between the base and emitter completely enters a reverse bias state, so that an accumulating operation by the photoelectric conversion is started.

Such a transient resetting operation is executed to each of the transistors 1 corresponding to the pixels of each row. After the elapse of a predetermined accumulating time, further, the pulse of the H level is supplied to the terminal 123 at time $t_7$ and the transistors 10, 11, and 12 are turned on, thereby resetting the storage capacitors $C_{11}$ to $C_{13}$ to the ground level.

Subsequently, the vertical shift resister 103 is again made operative. The pulse is supplied to the driving line 111 at time $t_8$ and the pulse is further sent to the terminal 120 at time $t_9$, thereby turning on the transistor 3. Consequently, the driving line 114 is set to the H level and the base potential of each of the transistors 1 of the first row rises through the capacitor $C_B$. Thus, the transistors 1 are made operative and the signals of the pixels are read out, respectively, and are temporarily stored in the capacitors $C_{11}$ to $C_{13}$.

The pulse is supplied to the terminal 124 at time $t_{11}$ and the transistor 16 is turned on, thereby resetting. After that, the pulses are sequentially supplied to the driving lines 131, 132, and 133 by the horizontal shift register 101 from time $t_{12}$ and the transistors 13, 14, and 15 are sequentially turned on, thereby sequentially reading out the signal voltages of the capacitors $C_{11}$ to $C_{13}$. For such a period of time, the pulse is supplied to the terminal 124, thereby resetting after the reading.

The signal voltages sequentially read out from the capacitors $C_{11}$ to $C_{13}$ are compared with the reference voltage which is supplied from the terminal 125 by the comparator 104. When at least one of the signal voltages exceeds the reference voltage, an output of the comparator 104 is set to the H level. In this instance, it is assumed that there is the reflection light from the target object.

In the case where the presence of the reflection light is detected by the comparator 104 as mentioned above, the second mode such that the power source voltage of the circuit is raised and set to the second voltage is set.

In the second mode, the foregoing photoelectric converting operation is also executed again. In this case, however, as shown in parentheses in FIG. 2, the pulses are supplied to the terminals 140 and 155 and the driving lines 151, 152, and 153, thereby performing the operations. Consequently, signal voltage is stored into storage capacitors $C_{21}$ to $C_{23}$. The horizontal shift register 102 is also used.

The signal voltages read out from the capacitors $C_{21}$ to $C_{23}$ are inputted to the 1H delay circuit 106 via the buffer amplifier 105 and is also inputted to the difference operation circuit 107. Edge information in the vertical direction is obtained as its differential output. On the basis of the edge information, various kinds of image processes can be executed by the image processing circuit 108.

According to the embodiment, therefore, it is possible to provide an intelligent photoelectric converting apparatus of low cost, constructed in a manner such that the common photoelectric converting devices are used in the first mode of the low electric power consumption and the second mode of the normal electric power consumption, the presence or absence of the reflection light in the first mode is always monitored, and when there is the reflection light, the mode is switched to the second mode, thereby executing the advanced processes.

Incidentaly, according to an experiment, proper result was confirmed in a condition where the first power source voltage is 3.3 volt and the second power source voltage is 5.0 volt.

Figure 3:
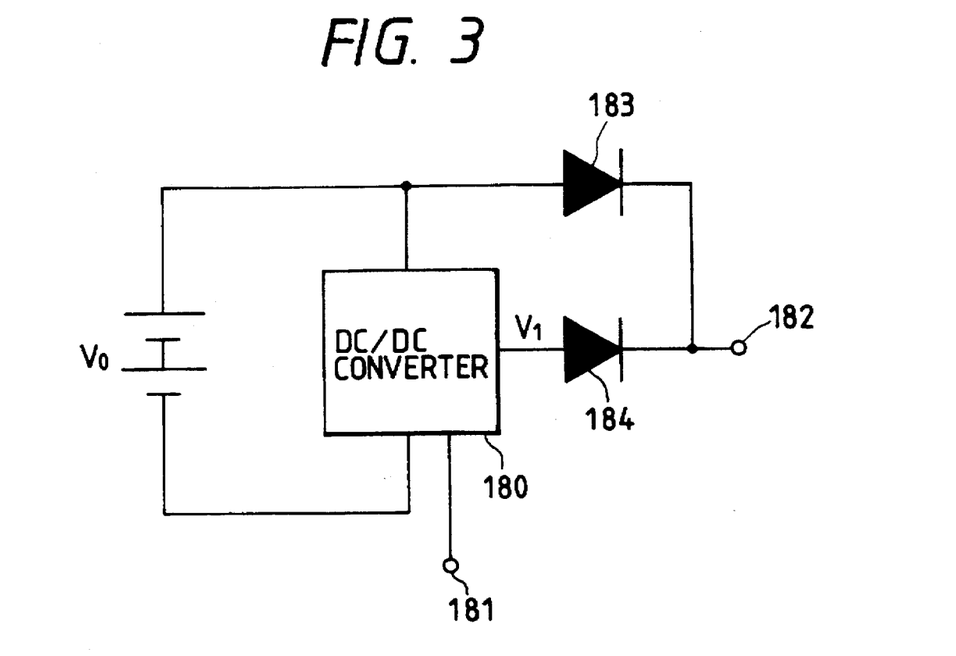
FIG. 3 is a circuit diagram showing an embodiment of a power source voltage detecting circuit.

FIG. 3 shows an embodiment of a power source voltage switching circuit.

In FIG. 3, a power source voltage $V_O$ of a low voltage is raised by a DC/DC converter 180. Output voltages $V_1$ and $V_O$ are wired-connected to an output terminal 182 through diodes 183 and 184. Further, the operation/non-operation of the DC/DC converter 180 is controlled by a control signal from a control input terminal 181 of the DC/DC converter 180, thereby enabling an output voltage of the output terminal 182 to be changed.

By the above construction, the apparatus ordinarily operates in the first mode and the electric power consumption is suppressed to a low value. In the case where the reflection light from the target object is detected, the mode is switched to the second mode, so that the image of the target object can be more clearly and more certainly detected.

Figure 4:
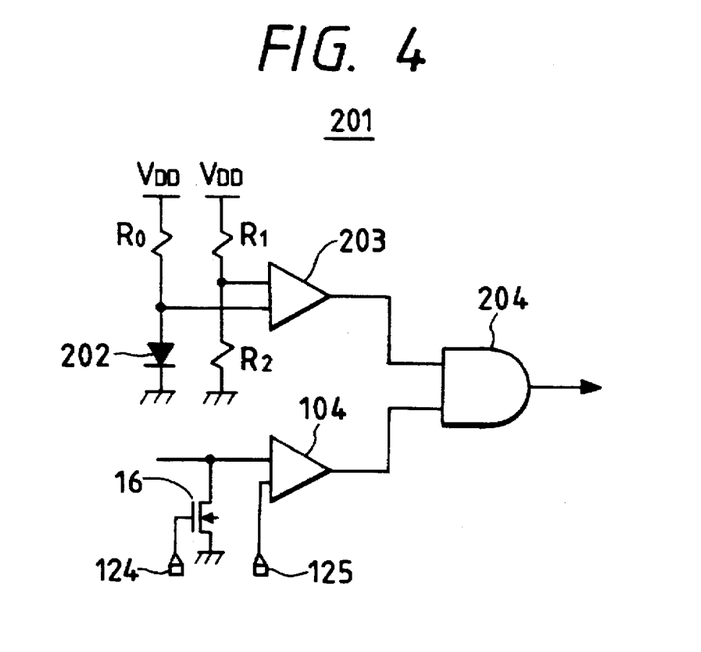
FIG. 4 is a circuit diagram showing the second embodiment of the invention.

FIG. 4 shows the second embodiment of the invention.

In the embodiment, a power source voltage detecting circuit 201 is provided. The circuit 201 comprises resisters $R_0$, $R_1$, and $R_2$, a diode 202, a comparator 203, and an AND gate 204 and is constructed so that an output of the comparator 104 is supplied to the AND gate 204. The other portions (not shown) in FIG. 4 are constructed in a manner similar to those in FIG. 1.

The embodiment relates to the improvement at the time of, particularly, the operation at a low voltage. When it is assumed that the lowest power source voltage at which the operation of the whole circuit in FIG. 1 can be assured is set to $V_O$ and a voltage in the forward direction of the diode 202 is set to $V_F$, $R_1$ and $R_2$ are set so as to satisfy the following equation.

$$R_2/(R_1+R_2) \cdot V_O = V_F$$

Consequently, for example, in the case where the power source voltage $V_{DD}$ is shared with a different circuit in the system or the like, and when a voltage drop momentarily under $V_O$, an output of the comparator 203 is inverted. Therefore, when the presence or absence of the reflection light is judged by the output of the comparator 104, by obtaining the AND of the outputs of the comparators 203 and 104 by the AND gate 204, an erroneous detection can be prevented.

Figure 5:
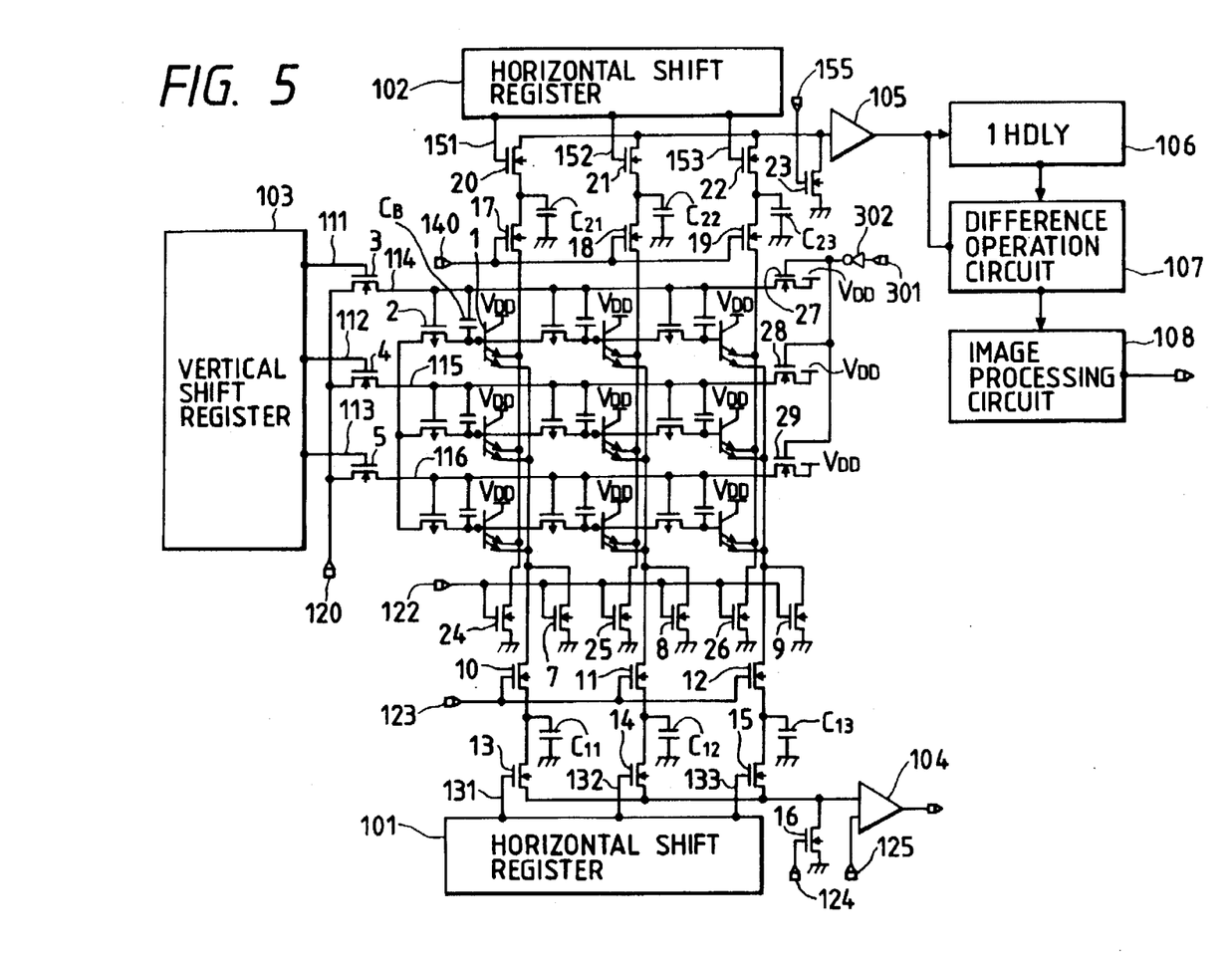
FIG. 5 is a circuit diagram showing the third embodiment of the invention.

FIG. 5 shows the third embodiment. Portions corresponding to those in FIG. 1 are designated by the same reference numerals. The embodiment is made by improving the first and second embodiments. It is an object of the embodiment to perform the judgment at a higher speed with respect to the presence or absence of the reflection light upon operating at a low voltage.

For this purpose, a transistor having a double emitter structure is used as a transistor 1 of each pixel in the embodiment. The emitters of the transistors 1 are commonly connected every column, respectively. One connection point of the emitters is connected to a reading system of the first mode in which the capacitors $C_{11}$ to $C_{13}$ are mainly used. Another connection point of the emitters is connected to a reading system of the second mode in which the capacitors $C_{21}$ to $C_{23}$ are mainly used.

Transistors 24, 25, and 26 are connected to the emitter connection point of the reading system of the second mode. Transistors 27, 28, and 29 are connected to the driving lines 114, 115, and 116. Pulses are sent from a terminal 301 to their bases through an inverter 302.

Figure 6:
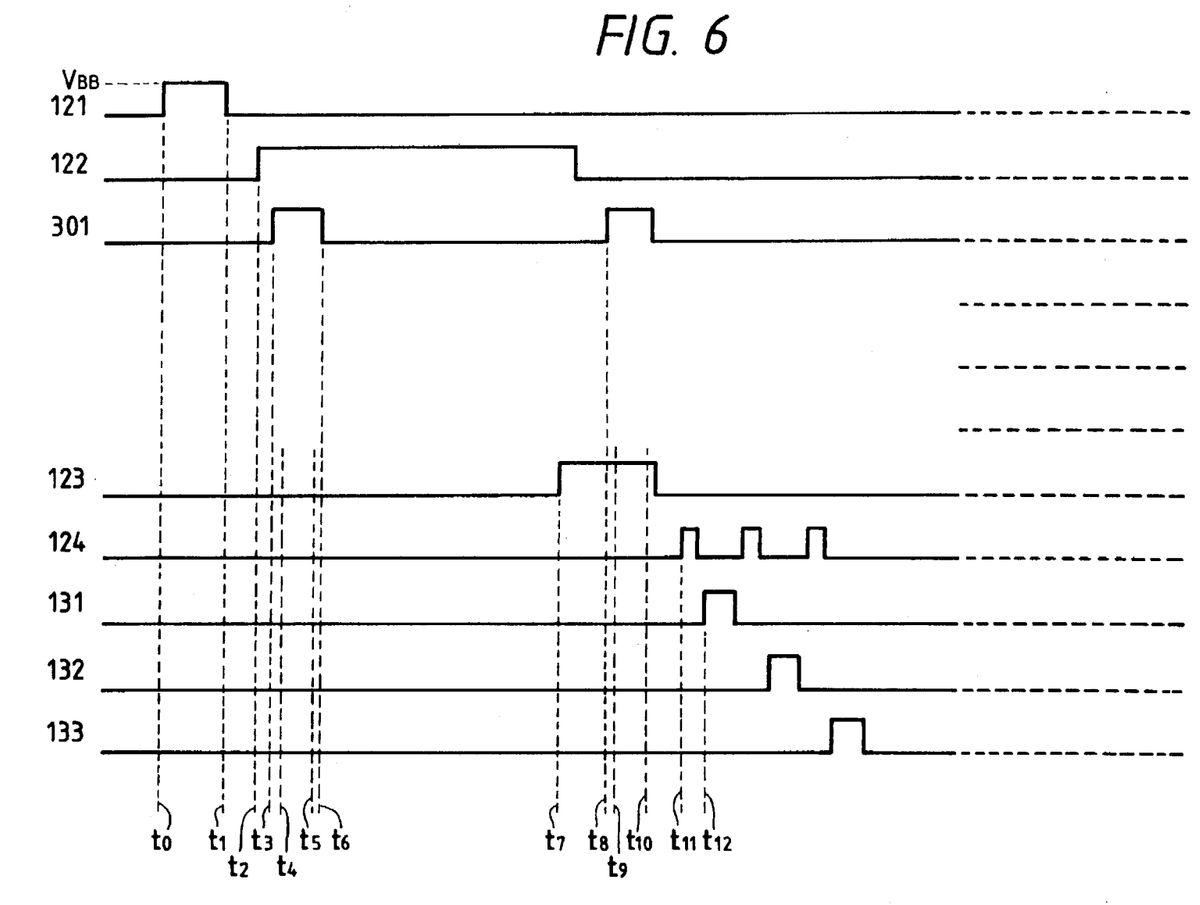
FIG. 6 is a timing chart showing the operation of the third embodiment.

The operation will now be described hereinbelow with reference to FIG. 6.

At time $t_0$ to $t_1$, the voltage $V_{BB}$ is applied to the terminal 121, thereby performing the clamping reset. Subsequently, a pulse to the terminal 122 is supplied from time $t_2$, while the vertical shift resister 103 is made now operative, and a pulse is supplied to the terminal 301 at time $t_3$. Consequently, the transistors 27 to 29 are turned on so that lines 114 to 116 are supplied with $V_{DD}$ and the transient reset is performed to the transistors 1 of all pixels at the same time.

The third embodiment differs from the first embodiment with respect to a point that a pulse is first supplied to the terminal 123 at time $t_7$ and then a pulse is also supplied to the terminal 301 at time $t_8$, thereby all the information stored in all the pixels are read out. By the above operation, peak signals of the first to third columns are read out to the capacitors $C_{11}$ to $C_{13}$, respectively.

Thus, a data amount at the time of the first mode operation is reduced to ⅓. Since the number of pixels further increases in the actual photoelectric converting apparatus, a compression ratio further rises. Therefore, the judgment about the presence or absence of the reflection light can be performed at an extreme high speed.

It is sufficient that the operation in the second mode when there is the reflection light is the same as that in the first embodiment. Although the peak of each column unit has been used as a peak output in the embodiment, by changing the connection lines, a peak output of a row unit or a peak output of a plane block of a few horizontal pixels or a few vertical pixels can be also easily used.

Figure 7:
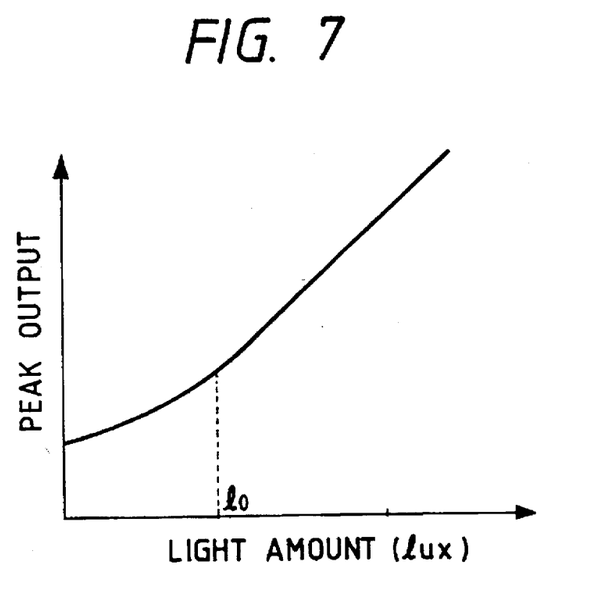
FIG. 7 is a graph for explaining photoelectric converting characteristics.

FIG. 7 shows characteristics obtained by calculations as photoelectric converting characteristics of the peak output of the pixel block constructed by three pixels which have been described in the embodiment. In this instance, it is assumed that two pixels among the three pixels are always set to a dark state and the light is irradiated to the remaining one pixel. An axis of abscissa indicates its light amount.

It will be understood from FIG. 7 that although there is a linearity in the case where the light amount of the reflection light from the target object is equal to or larger than $l_0$ [lux], in case of a low luminance which is equal to or less than $l_0$, the characteristics show non-linear. Therefore, in the case where the light of $l_0$ or more is irradiated, only the transistor 1 of the irradiated pixel performs the reading operation. When the light of $l_0$ or less is irradiated, the transistors 1 of two pixels in the dark state other than the pixel having a high luminance also perform the reading operations, so that a deviation from the original peak output substantially occurs.

Therefore, when the target object of a low luminance that is equal to or less than $l_0$ [lux] is sometimes erroneously detected, because an output difference between the case of where there is the reflection light and the case where there is no reflection light (y segment in FIG. 7) is small.

Figure 8:
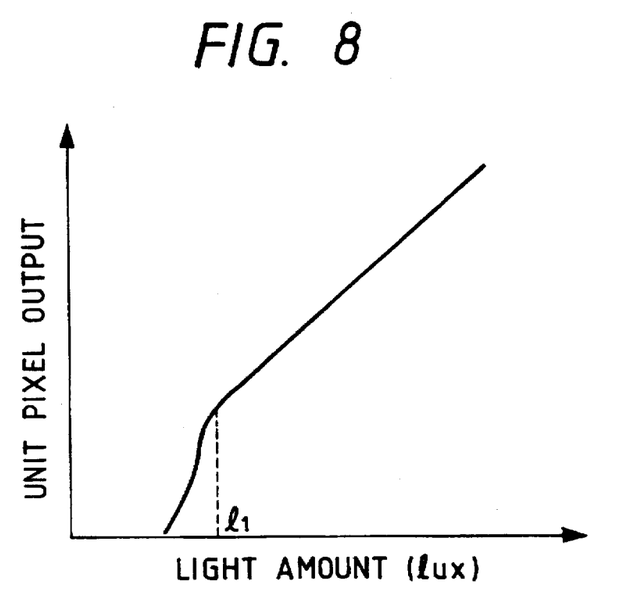
FIG. 8 is a graph for explaining the photoelectric converting characteristics.

In this case, it is sufficient to use characteristics shown in FIG. 8 of a sensor using a bipolar type NPN transistor. That is, each pixel is more deeply reset, (for example, a transient resetting time is set to a long time) and a forward bias amount between base and emitter at the end of the resetting is further reduced. By this method, in the reading operation, an enough forward bias is not applied between base and emitter of the transistor 1 in the low luminance area. Operating conditions are designated so as to have characteristics such that the photoelectric converting characteristics positively become non-linear at a light amount level of $l_1$ [lux] or less as shown in FIG. 8.

In the embodiment, therefore, when the resetting is deeply executed and $l_0$ and $l_1$ in FIGS. 7 and 8 are set so that $l_0 \cong l_1$, the peak luminance signal can be substantially detected at a higher precision. When the luminance of the reflection light of the target object to be detected has previously been known, the detecting precision can be improved by resetting so that such a luminance is equal to $l_1$.

Figure 9:
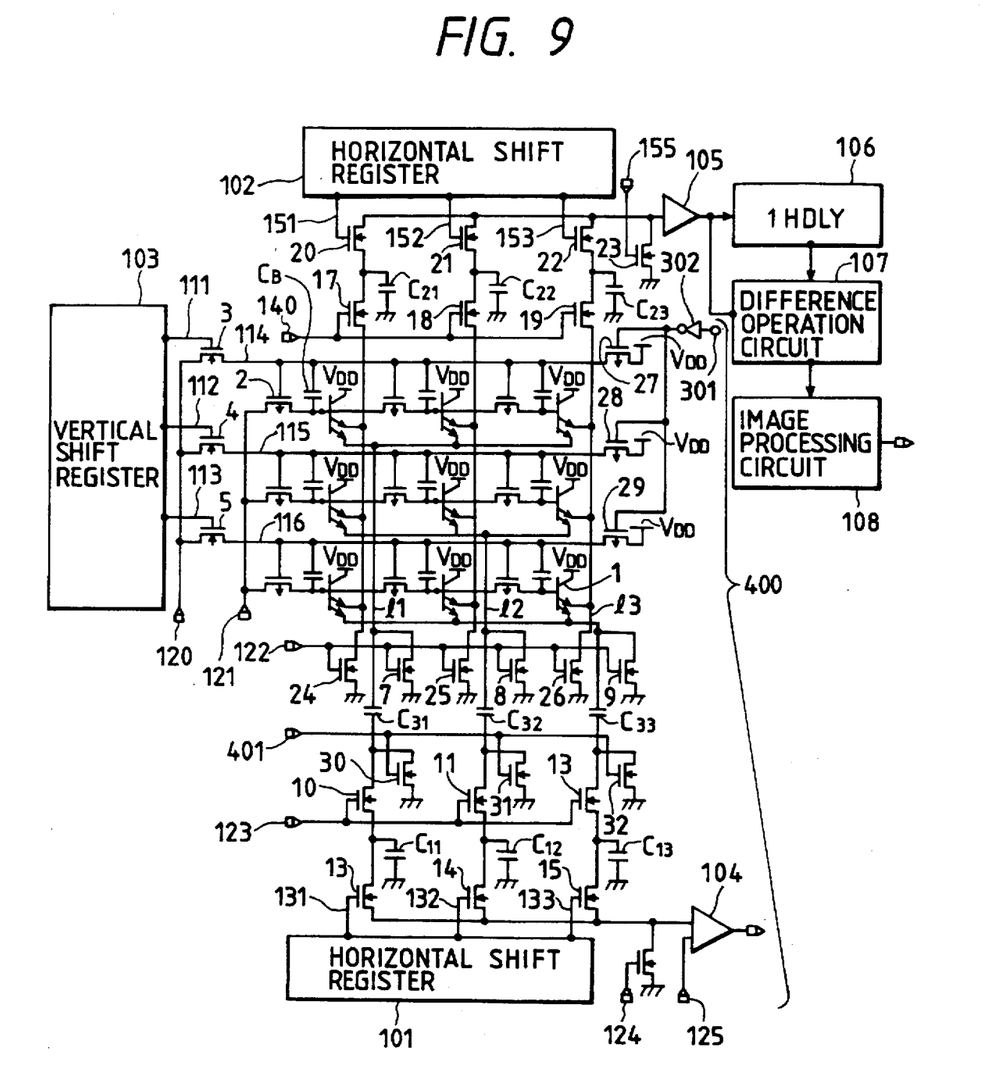
FIG. 9 is a circuit diagram showing the fourth embodiment of the invention.

FIG. 9 shows the fourth embodiment of the invention. The embodiment is constructed by adding a clamping circuit comprising capacitors $C_{31}$ to $C_{33}$, MOS transistors 30, 31, and 32, and a terminal 401 to the third embodiment in FIG. 5.

Figure 10:
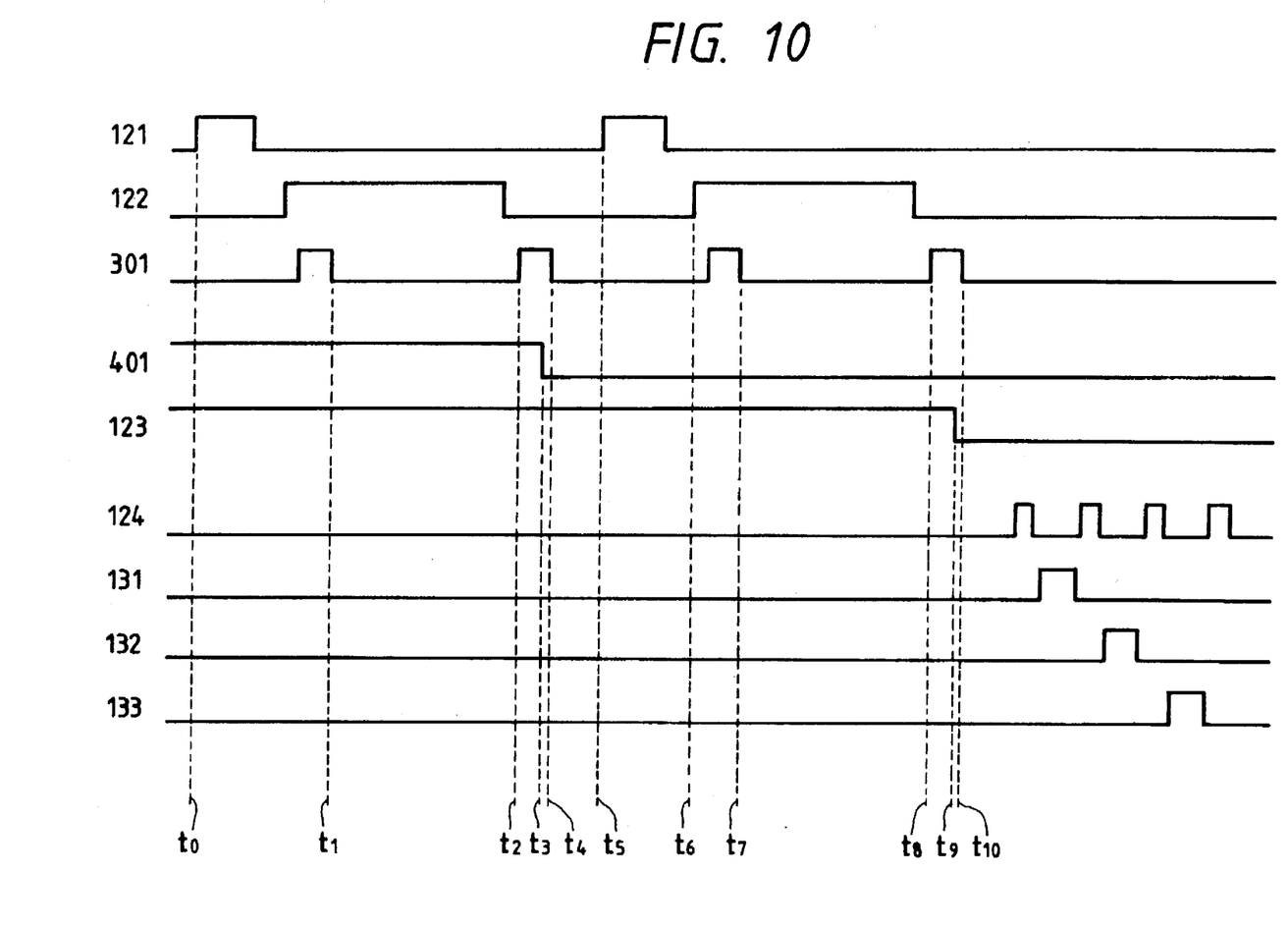
FIG. 10 is a timing chart showing the operation of the fourth embodiment.

The operation of the embodiment will now be simply described hereinbelow with reference to FIG. 10. First, the clamping reset and transient reset are performed at time from $t_0$ to $t_1$ and a predetermined accumulating operation is executed. After that, the reading operation of signals is started at time $t_2$ and the charges are accumulated on the upper side in the diagram in the capacitors $C_{31}$ to $C_{33}$. Till this time, the pulse of the H level is supplied to each of the terminals 401 and 123 and the storage capacitors $C_{11}$ to $C_{13}$ are in the reset state.

Subsequently, at time $t_3$ just before the end of the reading operation, the pulse of the terminal 401 is trailed and the capacitors $C_{11}$ to $C_{13}$ are set to the floating state. After that, the reading operation is finished at time $t_4$. At this time, the clamping reset and transient reset are again performed with respect to the signal voltages which were read out to vertical output lines $l_1$ to $l_3$ for a period of time from $t_5$ to $t_7$.

When the pulse is supplied to the terminal 122 at time $t_6$, the vertical output lines $l_1$, $l_2$, and $l_3$ are reset from the levels of V1 to V3 so far to the ground level, respectively. Therefore, potentials of the capacitors $C_{11}$ to $C_{12}$ are also set to $-\alpha V_1$, $-\alpha V_2$, and $-\alpha V_3$. "$\alpha$" in this case denotes a coefficient comprising the clamping capacitors $C_{31}$ to $C_{33}$, temporary storage capacitors $C_{11}$ to $C_{13}$, and a parasitic capacitor.

After time $t_7$, the transistor 1 of each pixel restarts the accumulating operation. For such a period of time, however, when the light of light emitting means such as an LED or the like is irradiated to a target object detecting area, so long as the target object exists in such an area, the reflection light is photoelectrically converted. After that, when a predetermined accumulating time is finished, the operation to read out the signals from the pixels is executed at time $t_8$. At time $t_9$ just before the end of the reading operation, the pulse of the L level is supplied to the terminal 123 and the storage capacitors $C_{11}$ and $C_{13}$ are disconnected from the clamping circuit.

Now assuming that the signal reading voltages of the pixels at this time are set to V1' to V3', the voltages held in the capacitors $C_{11}$ to $C_{13}$ are equal to $\alpha(V1'-V1)$, $\alpha(V2'-V2)$, and $\alpha(V3'-V3)$, respectively. After that, in a manner similar to the first embodiment, the voltages held in the capacitors $C_{11}$ to $C_{13}$ are serially read out and the operation to detect the presence or absence of the reflection light is executed.

When the reflection light is detected, the mode is changed to the second mode and the reading operations from the capacitors $C_{21}$ to $C_{23}$ are performed, thereby executing the detailed signal processes in the image processing circuit 108.

Figure 11:
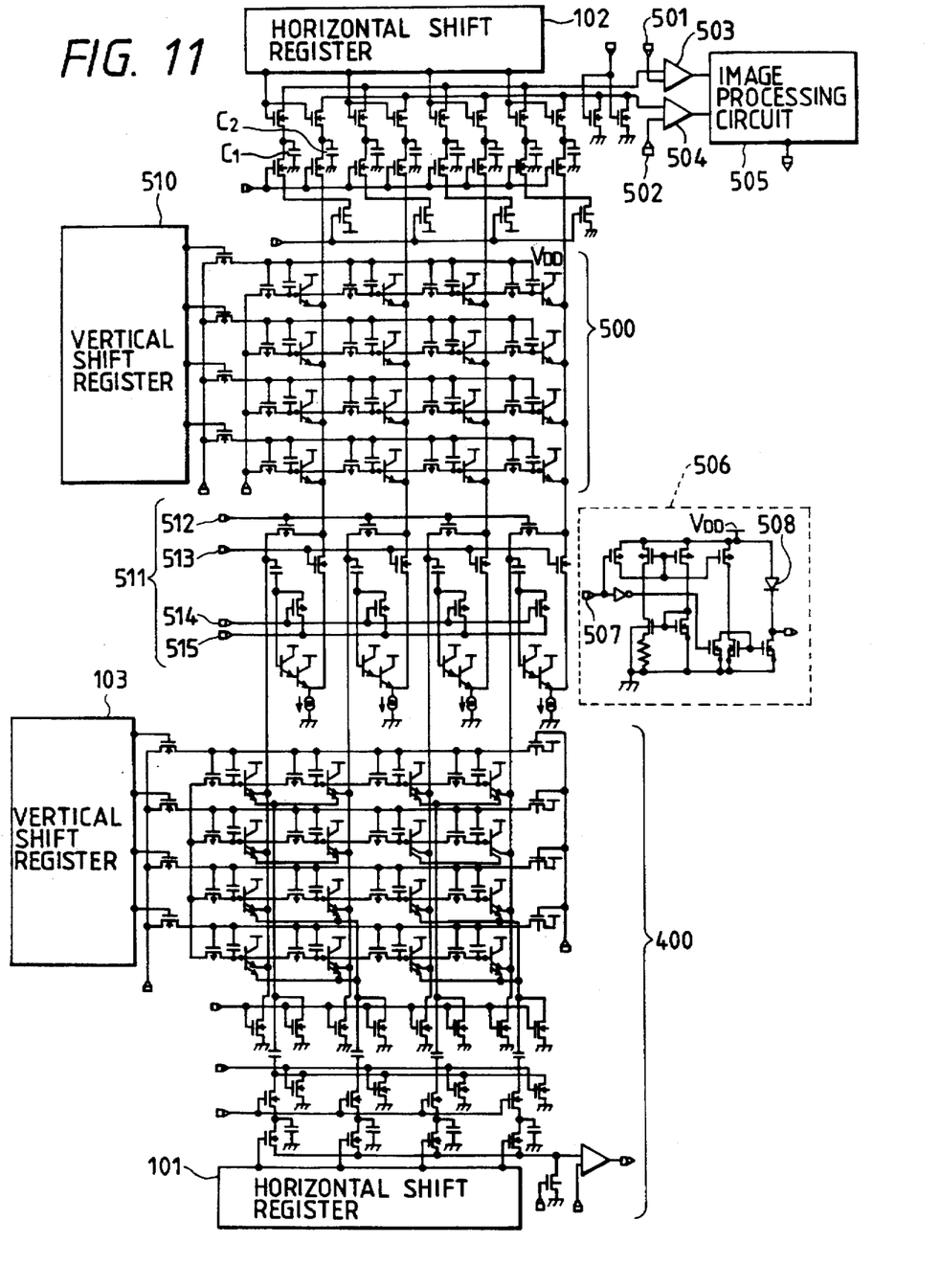
FIG. 11 is a circuit diagram showing the fifth embodiment of the invention.

FIG. 11 shows the fifth embodiment of the invention.

A circuit portion shown at reference numeral 400 in the embodiment is substantially the same as the circuit portion 400 in FIG. 9. With respect to the operation, the operation portion in the first mode at a low voltage is also substantially the same as that of the fourth embodiment. However, as an operation portion in the second mode at the second power source voltage, a memory 500 using an NPN transistor as a memory device is used. The memory 500 is constructed by arranging the above memory elements in the row and column directions and is driven by a vertical shift register 510. Signals stored in the foregoing circuit portion 400 are transferred to the memory 500 by a transfer circuit unit 511. The transfer circuit unit 511 has terminals 512 to 515 and is constructed as shown in the diagram. By supplying control pulses to the terminals 512 to 515 at predetermined timings, a signal of each pixel of the row selected by the vertical shift register 103 can be transferred to each pixel of the row in the memory 500 selected by the vertical shift register 510. The signals read out from the memory 500 are held in the every two temporary storage capacitors $C_1$ and $C_2$ and are serially read out, respectively. The read-out signal voltages are compared with the reference voltages supplied from terminals 501 and 502 by comparators 503 and 504. The comparison results are signal processed by an image processing circuit 505.

In the embodiment, the case where the signals read out from the memory 500 are simultaneously compared with the different reference voltages has been shown. It is also possible to construct such that a differential arithmetic operation is executed between the adjacent pixels by using a differential amplifier and an edge component in the horizontal or vertical direction is extracted. On the basis of such an edge component, an advanced filtering process or the like can be performed in the image processing circuit 505.

In the embodiment, a constant current circuit 506 serving as a driving circuit surrounded by a broken line is also provided. In such a circuit, a pulse timing at which a pulse is inputted to a control terminal 507 and a sequence comprising a resetting process, a reading process, and the like of the photoelectric converting apparatus can be easily synchronized. Light emitting means 508 such as an LED or the like is allowed to emit the light synchronously with the foregoing pulse timing, thereby enabling the target object to be irradiated.

The constant current circuit 506 in FIG. 11 and the power source voltage detecting circuit 201 and power source switching circuit in FIG. 3 can be used in the first to fifth embodiments, respectively.

As mentioned above, according to the first embodiment of the invention, by providing the first circuit unit which operates at the low power source voltage and the second circuit unit which operates at the high power source voltage, there is an effect such that the apparatus is efficiently made operative and the electric power consumption can be reduced.

According to another embodiment, only the reflection light from the target object is detected by making the first circuit unit operative at the low power source voltage and the image of the target object is detected in detail by making the second circuit unit operative at the high power source voltage on the basis of such a detection, so that there is an effect such that the electric power consumption can be reduced and the target object can be detected at a high precision.

By detecting the maximum luminance in the detecting area, there is also an effect such that a detection at a higher speed can be executed.

By performing the detection by using the detection level by the light other than the light source as a reference, there is also an effect such that the target object of a low luminance can be detected at a high precision.

By providing the power source voltage detecting circuit, there is also an effect such that an erroneous detection in the case where the power source voltage is temporarily fluctuated can be prevented.

By providing the circuit which is driven by synchronizing the light source for illuminating with the operation sequence of the photoelectric conversion, there is also an effect such that the electric power consumption can be further reduced.

What is claimed is:

1. A detecting method by a photoelectric converting apparatus having a first circuit unit which operates at a first power source voltage and a second circuit unit which operates at a second power source voltage higher than the first power source voltage and at least a part of which is common to the first circuit unit, comprising:

a first step of detecting reflection light from a target object by making the first circuit unit operative at the first power source voltage; and a second step of detecting an image of the target object by making the second circuit unit operative at the second power source voltage when the reflection light is detected.

2. A method according to claim 1, wherein the presence or absence of the reflection light is detected by detecting a maximum luminance in a desired detection area of the photoelectric converting apparatus.

3. A method according to claim 1, wherein said detection is performed by using a detection output level, as a reference, which is caused by a light other than an illumination light from a light source to illuminate the target object.

4. A method according to claim 1, wherein said first step further comprises detecting a peak of the reflection light.

5. A method according to claim 1, wherein an amount of data to be detected in said first step is set to be less than that in said second step.

6. A detecting apparatus using a photoelectric converting apparatus having a first circuit unit which operates at a first power consumption mode and a second circuit unit which operates at a second power consumption mode higher than said first power consumption mode and at least a part of which is common to said first circuit unit, comprising:

first control means for detecting reflection light from a target object by making said first circuit unit operative at said first power consumption mode; and second control means for detecting an image of said target object by making said second circuit unit operative at said second power consumption mode when said reflection light is detected.

7. An apparatus according to claim 6, wherein the presence or absence of said reflection light is detected by detecting a maximum luminance in a desired detection area of said photoelectric converting apparatus.

8. An apparatus according to claim 6, wherein said detection is performed by using a detection output level, as a reference, which is caused by light other than illumination light from a light source to illuminate said target object.

9. An apparatus according to claim 6, wherein said first control means detects a peak of said reflection light.

10. An apparatus according to claim 6, wherein said first control means sets an amount of data to be detected, smaller than that of said second control means.

11. A detecting method by a photoelectric converting apparatus having a first circuit unit which operates at a first power consumption mode and a second circuit unit which operates at a second power consumption mode higher than the first power consumption mode and at least a part of which is common to the first circuit unit, comprising:

a first step of detecting reflection light from a target object by making the first circuit unit operative at the first power consumption mode; and a second step of detecting an image of the target object by making the second circuit unit operative at the second power consumption mode when the reflection light is detected.

12. A method according to claim 11, wherein the presence or absence of the reflection light is detected by detecting a maximum luminance in a desired detection area of the photoelectric converting apparatus.

13. A method according to claim 11, wherein said detection is performed by using a detection output level, as a reference, which is caused by light other than illumination light from a light source to illuminate the target object.

14. A method according to claim 11, wherein said first step further comprises detecting a peak of the reflection light.

15. A method according to claim 11, wherein an amount of data to be detected in said first step is set to be less than that in said second step.

16. A detecting apparatus using a photoelectric converting apparatus, comprising:

first control means for detecting reflection light from a target object in a first data amount at a first power consumption mode; and second control means for detecting an image of said target object in a second data amount larger than said first data amount at a second power consumption mode when said reflection light is detected, wherein said second power consumption mode consumes more power than said first power consumption mode.

17. An apparatus according to claim 16, wherein the presence or absence of said reflection light is detected by detecting a maximum luminance in a desired detection area of said photoelectric converting apparatus.

18. An apparatus according to claim 16, wherein said detection is performed by using a detection output level, as a reference, which is caused by light other than illumination light from a light source to illuminate said target object.

19. An apparatus according to claim 16, wherein said first control means detects a peak of said reflection light.

20. A detecting apparatus using a photoelectric converting apparatus comprising:

first control means for detecting a maximum luminance, corresponding to reflection light from a target object, in a desired detection area of said photoelectric converting apparatus at a first power consumption mode; and second control means for detecting an image of said target object at a second power consumption mode when said maximum luminance is detected, wherein said second power consumption mode consumes more power than said first power consumption mode.

21. An apparatus according to claim 20, wherein said detection is performed by using a detection output level, as a reference, which is caused by light other than illumination light from a light source to illuminate said target object.

22. An apparatus according to claim 20, wherein said first control means sets an amount of data to be detected smaller than that of said second control means.

* * * * *

UNITED STATES PATENT AND TRADEMARK OFFICE
CERTIFICATE OF CORRECTION

PATENT NO. : 5,693,932

DATED : December 2, 1997

INVENTOR(S): ISAMU UENO, ET AL.

It is certified that error appears in the above-identified patent and that said Letters Patent is hereby corrected as shown below:

ON THE TITLE PAGE: Item [54]

In the title "COMSUMPTION" should read --CONSUMPTION--.

COLUMN 1

Line 3, "COMSUMPTION" should read --CONSUMPTION"--;
Line 21, "are" should read --are the--;
Line 60, "further another" should read --yet another--.

COLUMN 4

Line 60, "is" should read --are--.

COLUMN 5

Line 8, "Incidentaly" should read --Incidentally--;
Line 31, "resisters" should read --resistors--;
Line 49, "drop" should read --drops--.

UNITED STATES PATENT AND TRADEMARK OFFICE
CERTIFICATE OF CORRECTION

PATENT NO. : 5,693,932

DATED : December 2, 1997

INVENTOR(S): ISAMU UENO, ET AL.

It is certified that error appears in the above-identified patent and that said Letters Patent is hereby corrected as shown below:

COLUMN 7

Line 2, "an enough" should read --a sufficient--;
Line 38, "$C_{12}$" should read --$C_{13}$--.

Signed and Sealed this

Twenty-first Day of July, 1998

*Attest:*

BRUCE LEHMAN

*Attesting Officer*    Commissioner of Patents and Trademarks